United States Patent
Hamada et al.

(10) Patent No.: US 7,172,832 B2
(45) Date of Patent: Feb. 6, 2007

(54) SEALED BATTERY AND BATTERY PACK

(75) Inventors: Shinji Hamada, Toyohashi (JP); Takashi Asahina, Toyohashi (JP); Toyohiko Eto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/225,444

(22) Filed: Sep. 14, 2005

(65) Prior Publication Data

US 2006/0057461 A1    Mar. 16, 2006

(30) Foreign Application Priority Data

Sep. 15, 2004 (JP) .............. 2004-268179
Sep. 13, 2005 (JP) .............. 2005-264795

(51) Int. Cl.
*H01M 2/02* (2006.01)
*H01M 2/24* (2006.01)
*H01M 2/30* (2006.01)

(52) U.S. Cl. .............. 429/157; 429/158; 429/179
(58) Field of Classification Search .............. None
See application file for complete search history.

(56) References Cited

U.S. PATENT DOCUMENTS 3,736,189 A * 5/1973 Ciliberti .............. 429/167
3,748,182 A * 7/1973 Brown .............. 429/123
4,002,808 A * 1/1977 Fafa .............. 429/157
6,365,297 B1 * 4/2002 Wolczak et al. .............. 429/159

FOREIGN PATENT DOCUMENTS

| JP | 2001-093503 | 4/2001 |
| JP | 2001-093508 | 4/2001 |

* cited by examiner

Primary Examiner—John S. Maples
(74) Attorney, Agent, or Firm—Finnegan, Henderson, Farabow, Garrett & Dunner, LLP

(57) ABSTRACT

A sealed battery (100) includes a power generation element (120), a battery case (110), and an external positive terminal (150) fixed to a first case wall (110a). Case side faces (110c, 110d) serve as external negative electrode portions providing an electrical connection to a negative electrode of the power generation element (120). The external positive terminal (150) has extended joint portions (155) extending in a direction perpendicular to the first case wall (110a). The extended joint portions (155) are laid to overlap from outside with and connected to the external negative electrode portions when the external positive terminal (150) of the sealed battery (100) is brought into contact with a second case wall (110b) of another sealed battery (100).

4 Claims, 10 Drawing Sheets

SEALED BATTERY AND BATTERY PACK

BACKGROUND OF THE INVENTION

1. Field of the Invention

The present invention relates to a sealed battery having a power generation which includes a positive electrode and a negative electrode and is housed in a battery case, and a battery pack provided with the sealed battery. In particular, the present invention relates to a sealed battery including an external positive terminal and an external negative electrode portion formed as a part of a battery case, and a battery pack provided with the sealed battery.

2. Description of Related Art

Heretofore, there have been known many sealed batteries each of which comprises a power generation element which includes a positive and negative electrodes and is housed in a battery case. For example, Japanese Unexamined Patent Publications (Kokai) Nos. 2001-93503 and 2001-93508 disclose such sealed batteries.

In the battery of Kokai No. 2001-93503, a plurality of negative electrodes and a plurality of positive electrodes are connected to current collecting plates, respectively. Each current collecting plate is provided with a connection projection which is fit in a connection hole perforated in a side wall of an electrolytic bath. Ends of the connection projections of adjoining unit cells are welded to each other to connect the unit cells in series. See FIGS. 2 and 7 and the corresponding explanation in Kokai No. 2001-93503.

In the battery of Kokai No. 2001-93508, a plurality of negative electrodes and a plurality of positive electrodes are connected to current collecting plates, respectively. A connection hole is perforated in a side wall of an electrolytic bath. A connection fitting is inserted in the connection hole. The current collecting plates of the adjoining unit cells are welded to each other through each fitting to connect the unit cells in series. See FIGS. 2 and 8 and the corresponding explanation in Kokai No. 2001-93508.

However, in the battery of Kokai No. 2001-93503 that the ends of the connection projections of the current collecting plates fitted in the connection holes of the electrolytic bath are welded to each other, a space has to be provided for a welding jig to be used for the welding. Therefore the connection hole would have to be formed in an upper portion of the electrolytic bath in order to avoid interference with the power generation element housed in the electrolytic bath. This inevitably results in an increased distance of an electrically conducting path from the positive and negative electrodes to a welded portion and further an increased electric resistance. In addition, the welding has to be performed from the inside of the electrolytic bath and hence the welding itself would not be easy.

In the battery of Kokai No. 2001-93508 that the current collecting plates are welded to the connection fittings inserted in the connection holes of the electrolytic bath, a space has to be provided for a welding jig to be used for the welding. Therefore the connection hole would have to be formed in an upper portion of the electrolytic bath in order to avoid interference with the power generation element housed in the electrolytic bath. Similarly, this inevitably results in an increased distance of an electrically conducting path from the positive and negative electrodes to a welded portion and further an increased electric resistance. In addition, the welding has to be performed from the inside of the electrolytic bath and hence the welding itself would not be easy.

As above, the conventional sealed batteries, which have to be designed to have a space therein for welding of the batteries, would be likely to include the long electrically conducting path from the power generation element to the external terminal of the battery and the large electric resistance. Further, the welding has to be performed from the inside of the electrolytic bath and hence the welding itself would not be easy.

SUMMARY OF THE INVENTION

The present invention has been made in view of the above circumstances and has an object to provide a sealed battery which is easily and reliably connected with another sealed battery, and a battery pack provided with such sealed battery.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a sealed battery comprising: a power generation element including a positive electrode and a negative electrode; a battery case which houses the power generation element and includes a first case wall, a second case wall formed in parallel with the first case wall, and one or plural case side walls joining the first and second case walls, at least one of the case side walls including at least a part made of an electrically conductive material and serving as an external negative electrode portion electrically connected to the negative electrode; and an external positive terminal which is fixed to the first case wall and electrically connected to the positive electrode, and includes a part exposed to an outside of the case; wherein the external positive terminal includes an extended joint portion extending in a direction perpendicular to the first case wall and is structured to overlap from outside with an external negative electrode portion of a second sealed battery when the first case wall of the sealed battery faces a second case wall of the second sealed battery and the external positive terminal is brought into contact with the second case wall of the second sealed battery.

According to the present invention, the external positive terminal of the sealed battery (hereinafter, referred to as a "first sealed battery" for convenience in explaining) includes the extended joint portion extending in a direction perpendicular to the first case wall. This external positive terminal is structured such that the extended joint portion overlaps from outside with the external negative electrode portion of another sealed battery (hereafter, referred to as a "second sealed battery" for convenience in explaining) when the first sealed battery is placed with the first case wall facing the second case wall of the second sealed battery so that the external positive terminal of the first sealed battery is brought into contact with the second case wall of the second sealed battery.

Accordingly, when the sealed batteries are placed in contact with each other, the extended joint portion and the external negative electrode portion can easily be connected from outside of the case side wall. Further, the sealed batteries connected to each other in the above manner are impervious to breaking down at the connected area even when the batteries receive vibration and impact or when an expansive force arises from charge and discharge of the batteries. The sealed battery can enhance connection reliability.

Herein, the "power generation element" has no particular restriction on design and others but has to include a positive electrode and a negative electrode. For instance, it may be designed such that a plurality of positive electrode plates having positive electrode active material layers and a plurality of negative electrode plates having negative electrode active material layers which are alternately laminated through separators interposed therebetween, and a part of each positive electrode plate (a positive electrode lead portion) is extended in a predetermined direction, while a part of each negative electrode plate (a negative electrode lead portion) is extended in an opposite direction to the positive electrode plate.

The "battery case" has no particular restriction on design, material, and others, but must have the first and second case walls and the case side walls as mentioned above. The shape thereof may be rectangular parallelepiped or cylindrical.

At least part of at least one of the case side walls of the battery case on at least the second case wall side is made of an electrically conductive material so that the part is electrically connected to the negative electrode. For instance, the case side wall may be made to include the electrically conductive material as a part of the case side wall adjacent to the second case wall and an insulating material as the other part. Alternatively, the case side wall may be entirely made of the electrically conductive material. The first case wall and the second case wall may be made of either the electrically conductive material or the insulating material, or made of a combination of both materials.

If metal is preferred for the battery case, an appropriate one has to be selected in view of resistance to an electrolytic solution (resistance to alkali), strength, electrical stabilization, and others. For example, available metal may include aluminum, aluminum alloy, nickel-plated carbon steel, austenitic stainless containing nickel in large quantity. If resin is preferred for the battery case, an appropriate one has to be selected in view of resistance to an electrolytic solution (resistance to alkali), strength, and others. For example, available resin may include polypropylene, polyethylene, polystyrene, a copolymer of modified polyphenylene ether and polystyrene, ABS resin, acrylonitrile styrene resin, polyamide, vinyl chloride resin, methacrylic resin, and mixtures of those resins.

Furthermore, in the above sealed battery, preferably, the external positive terminal is structured that the extended joint portion overlaps from outside with a minimum conducting distance area of the external negative electrode portion of the second sealed battery, having an electrically conducting path of a minimum distance to the negative electrode of the second sealed battery.

According to the present invention, the external positive terminal is structured such that the extended joint portion overlaps from outside with the minimum conducting distance areas of the external negative electrode portion of the second sealed battery having the electrically conductive path of the minimum distance to its negative electrode. Such configuration can provide the minimum electrically conducting path from the negative electrode of the power generation of one sealed battery to the extended joint portion of the external positive terminal of another sealed battery when the batteries are connected to each other. This makes it possible to minimize the electrical resistance from the negative electrode to the extended joint portion.

In the above sealed battery, further preferably, the battery case is of a rectangular parallelepiped shape having the four case side walls, the external positive terminal includes a plurality of the extended joint portions and is structured that the extended joint portions overlap from outside with the external negative electrode portions of two of the four case side walls of the second sealed battery.

According to the present invention, the battery case is of a rectangular parallelepiped shape, having four case side walls. The external positive terminal has a plurality of extended joint portions. The extended joint portions are designed to overlap from outside with the external negative electrode portions of two opposite case side walls of the four case side walls. With this configuration, the batteries can be connected to each other with the extended joint portions engaging the opposite two case side walls from both sides. This makes it possible to ensure fixing of the sealed batteries.

According to another aspect of the present invention, there is provided a battery pack having at least one battery module which is including a plurality of the sealed batteries according to claim 1, wherein the battery module includes the sealed batteries arranged in series such that the first case wall of one of the sealed batteries faces the second case wall of a second sealed battery, and the extended joint portion of the sealed battery is connected to the external negative electrode portion of the second sealed battery so as to electrically connect the sealed batteries to each other in series.

The above battery pack can easily be produced because the sealed batteries can be connected to each other by connecting the extended joint portion and the external negative electrode portion from outside of the case side wall. In the battery pack, the sealed batteries connected to each other are impervious to breaking down at the connected area even when the battery pack receives vibration and impact or when an expansive force arises from charge and discharge. The battery pack also can enhance connection reliability.

The means for connecting the extended joint portion and the external negative electrode portion may be any means, for example, welding, soldering, or the like. In particular, the welding is preferred.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of preferred embodiments of the present invention will now be given referring to the accompanying drawings.

[FIRST EMBODIMENT]

Figure 1:
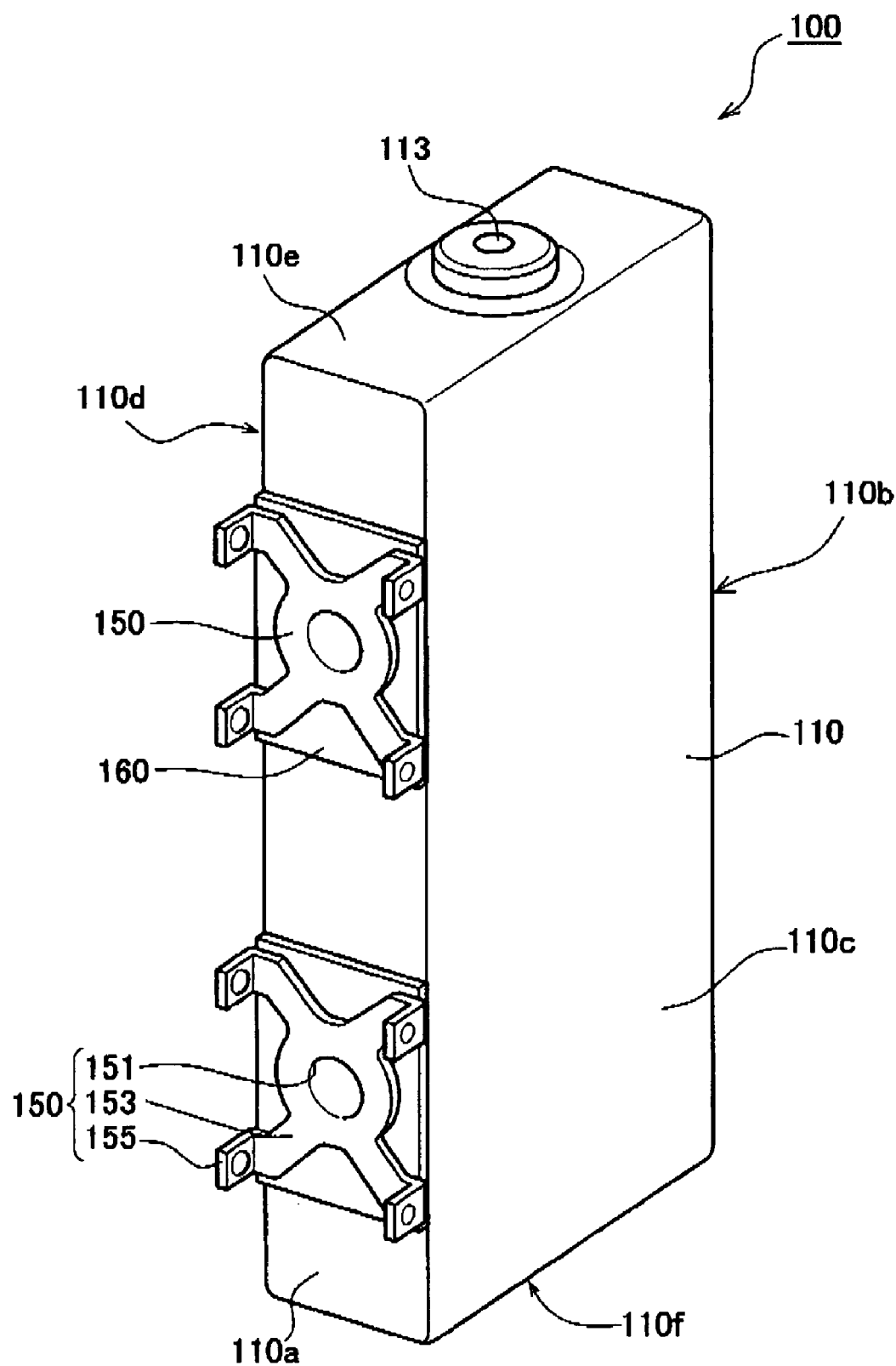
FIG. 1 is a perspective view of a sealed battery in a first embodiment.
Figure 2:
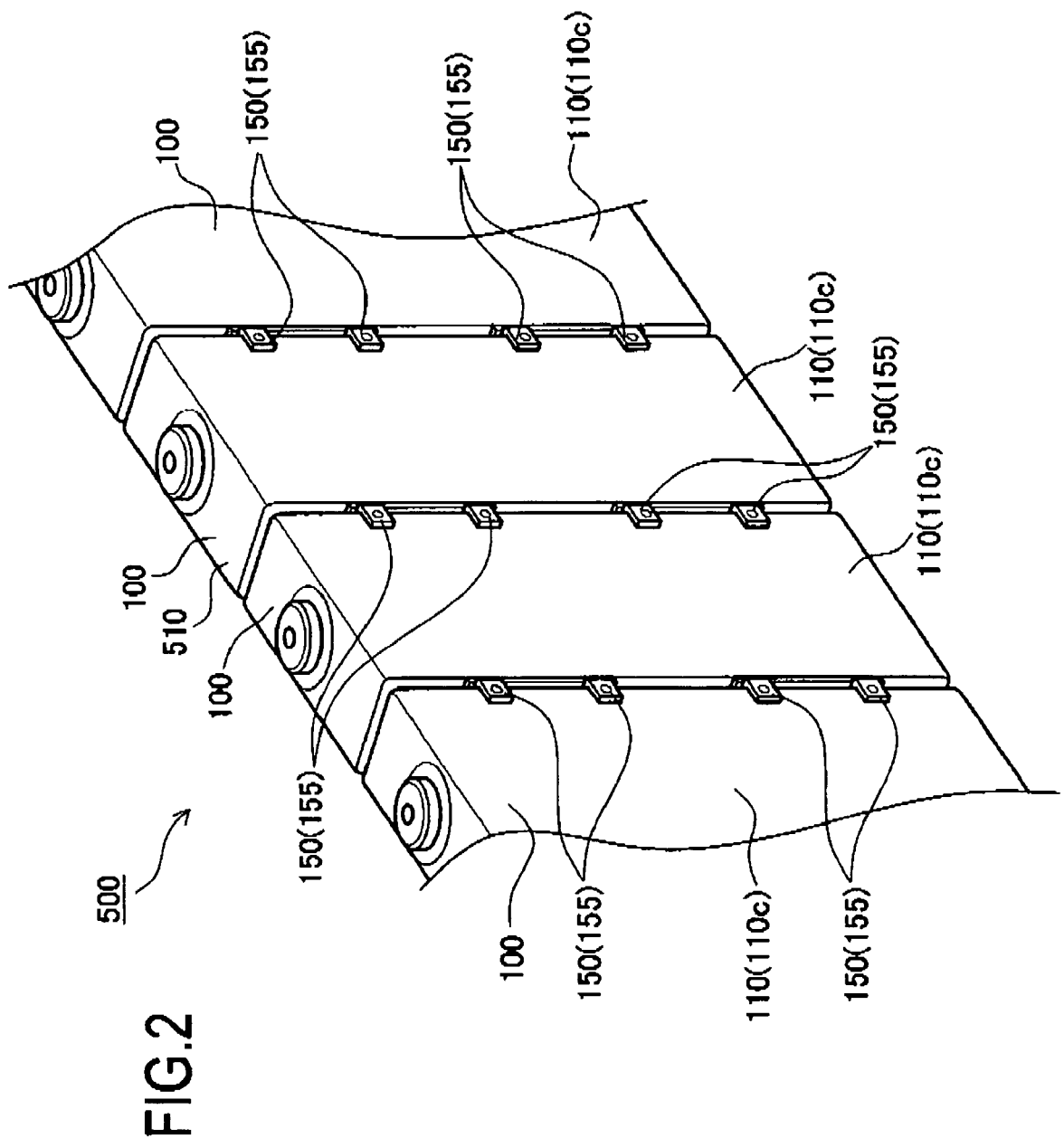
FIG. 2 is a perspective view of a part of a battery pack in the first embodiment.
Figure 3:
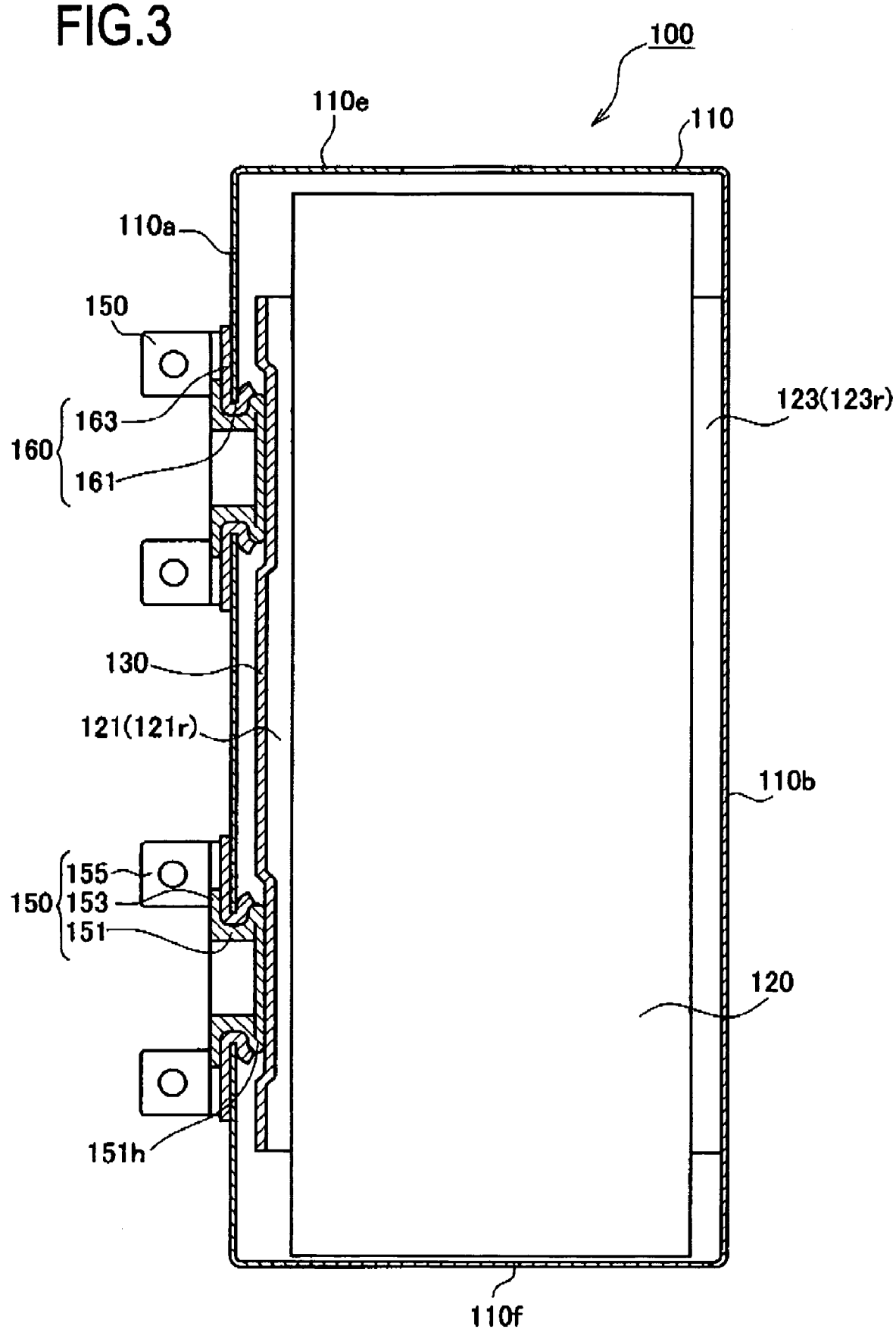
FIG. 3 is a sectional view of the sealed battery in the first embodiment.
Figure 4:
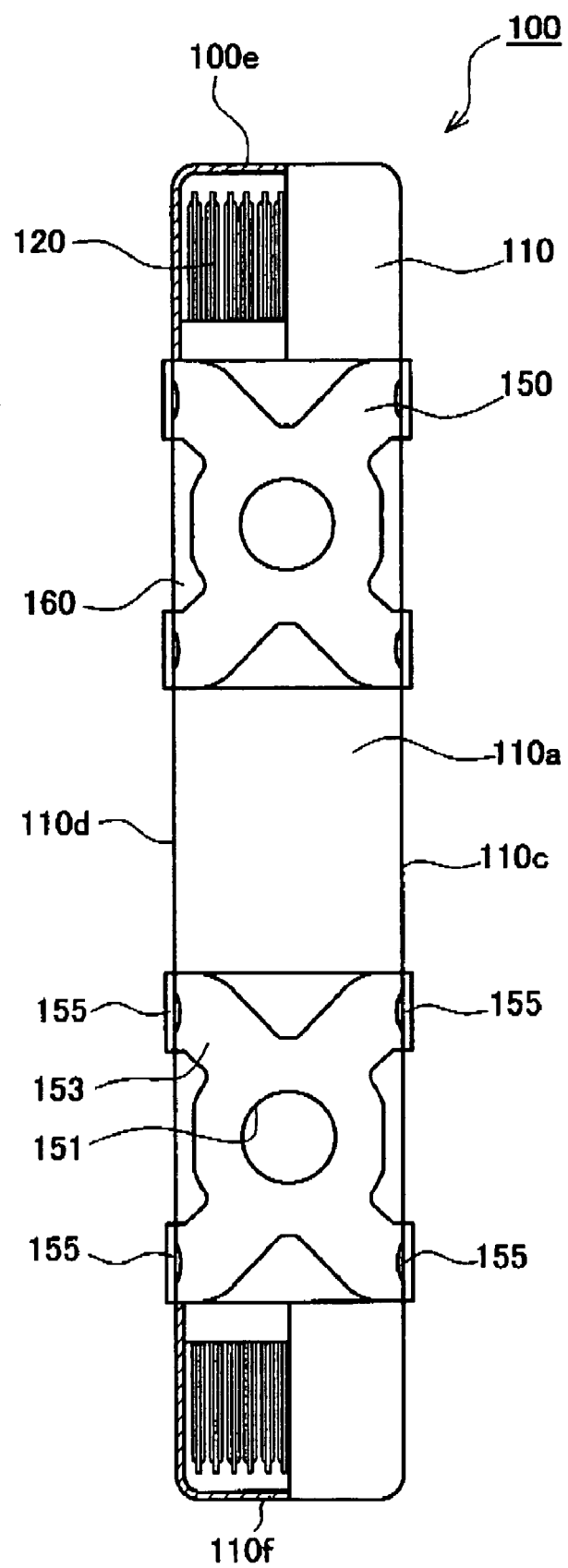
FIG. 4 is an explanatory view of the sealed battery seen from a first case wall side.
Figure 5:
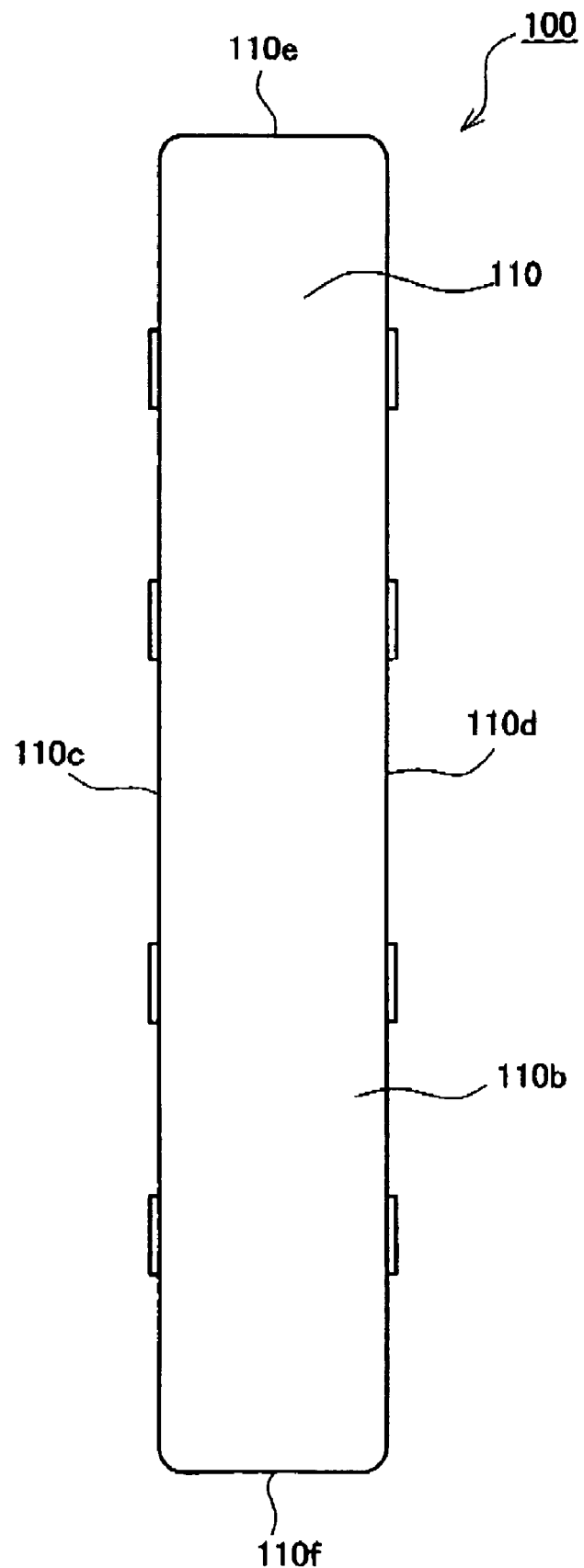
FIG. 5 is an explanatory view of the sealed battery seen from a second case wall side.
Figure 6:
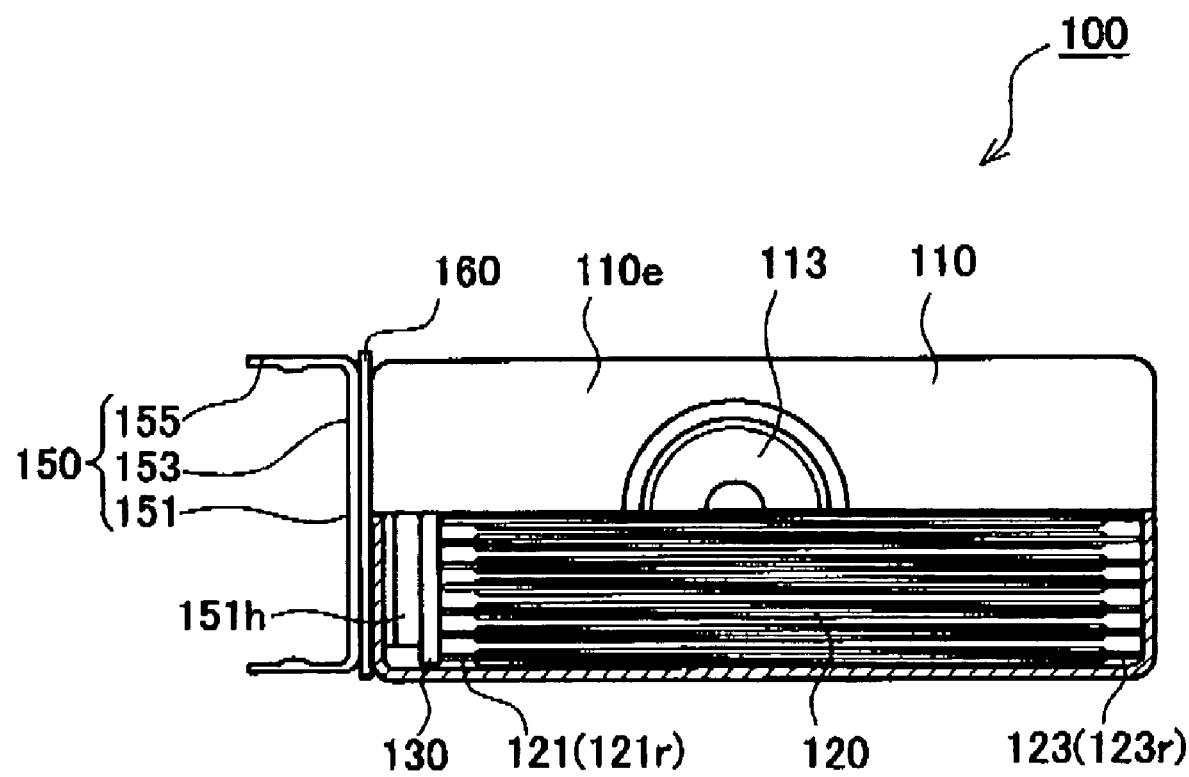
FIG. 6 is an explanatory view of the sealed battery seen from a third case wall side.

A first embodiment of the present invention will be explained below with reference to the accompanying drawings. FIG. 1 is a perspective view of a sealed battery 100 in the first embodiment. FIG. 2 is a perspective view of a part of a battery module 510 constituting a battery pack 500 in the present embodiment. FIG. 3 is a sectional view of the sealed battery 100. FIG. 4 is a view of the sealed battery 100 seen from a first case wall 110a side. FIG. 5 is a view of the scaled battery 100 seen from a second case wall 110b side. FIG. 6 is a view of the sealed battery 100 seen from a third case wall 110e side.

Referring to FIGS. 1, 3 through 6, the sealed battery 100 is a secondary battery usable as a power supply for battery cars and hybrid cars, e.g., a nickel hydride rechargeable battery, and also a rectangular battery of a substantially rectangular parallelepiped shape. This sealed battery 100 includes a battery case 110 of a rectangular parallelepiped shape, a power generation element 120 housed in the battery case 110, a positive electrode collecting plate 130 fixedly provided in the battery case 110, external positive terminals 150 fixedly provided on the battery case 110, and others. The sealed battery 100 is filled with an electrolytic solution.

The battery case 110 is made of an electrically conductive material (a nickel-plated steel plate) and includes a first case wall 110a (a front wall in FIG. 1) having a rectangular flat plate shape, a second case wall 110b (a back wall not shown in FIG. 1) which is equal in shape to the first case wall 110a and positioned in parallel thereto, two case side walls (a first case side wall 110c and a second case side wall 110d each having a rectangular flat plate shape which is interposed between the first and second case walls 110a and 110b along their long sides, and two other case side walls (a third case side wall 110e and a fourth case side wall 110f) each having a rectangular flat plate shape which is interposed between the first and second case walls 110a and 110b along their short sides (see FIGS. 1, 3 through 6). It is to be noted that the "case wall" and "case side wall" will be referred hereinafter to as "wall" and "side wall" for convenience in explaining.

The first wall 110a is formed with two through holes at a predetermined interval in a longitudinal direction. The external positive terminals 150 are fixedly provided in the through holes respectively in an electrically insulated state from the first wall 110a as mentioned later. The third side wall 110e (upper in FIG. 1) is substantially centrally formed with a through hole in which a safety valve 113 is fixedly provided.

The power generation element 120 includes a plurality of positive electrode plates 121 each having a positive electrode active material layer (not shown) and a plurality of negative electrode plates 123 each having a negative electrode active material layer (not shown) so that the plates 121 and 123 are alternately laminated with separators interposed therebetween. Each positive electrode plate 121 includes a positive electrode lead portion 121r having no positive electrode active material layer and extending in a predetermined direction (leftwards in FIG. 3). On the other hand, each negative electrode plate 123 includes a negative electrode lead portion 123r having no negative electrode active material layer and extending in an opposite direction (rightwards in FIG. 3) to the positive electrode lead portion 121r.

Each positive lead portion 121r is welded to the positive electrode collecting plate 130 which will be mentioned later. Each negative lead portion 123r is directly welded to the inside of the second wall 110b of the battery case 110. The battery case 110 is made of an electrically conductive material, so that the first, second, third, and fourth side walls 110c, 110d, 110e, and 110f entirely serve as an external negative electrode portion which provides an electrical connection to the negative electrode. The first wall 110a and the second wall 110b also serve as a negative electrode portion.

The positive electrode collecting plate 130 is made of an electrically conductive material (a nickel-plated steel plate). The positive electrode lead portions 121r of the positive electrode plates 121 of the power generation element 120 are electrically connected to one face (a right face in FIG. 3) of the positive electrode collecting plate 130 by welding. Further, the external positive terminals 150 are electrically connected to the other face (a left face in FIG. 3) of the positive electrode collecting plate 130 by welding.

Figure 7:
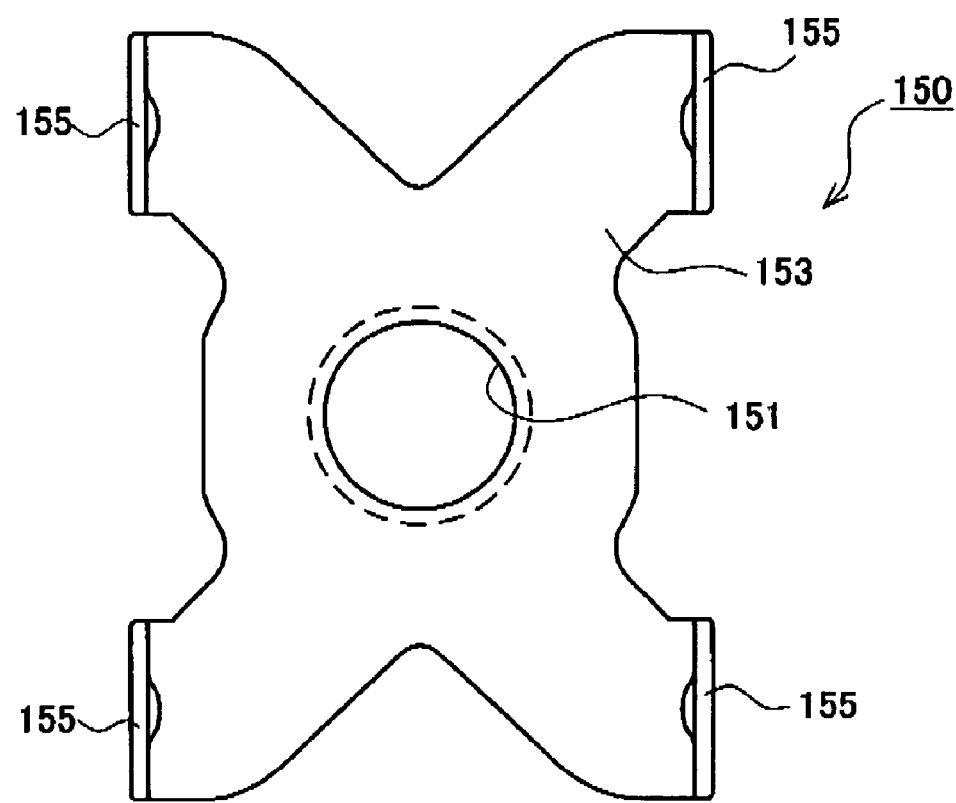
FIG. 7 is a front view of an external positive terminal in the first embodiment.
Figure 8:
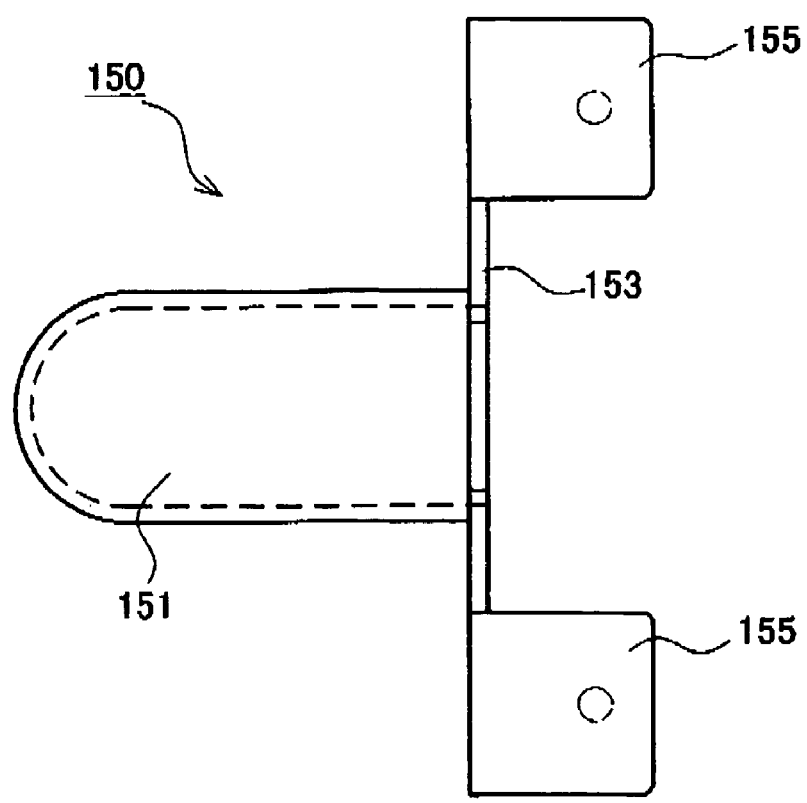
FIG. 8 is a side view of the external positive terminal in the first embodiment.
Figure 9:
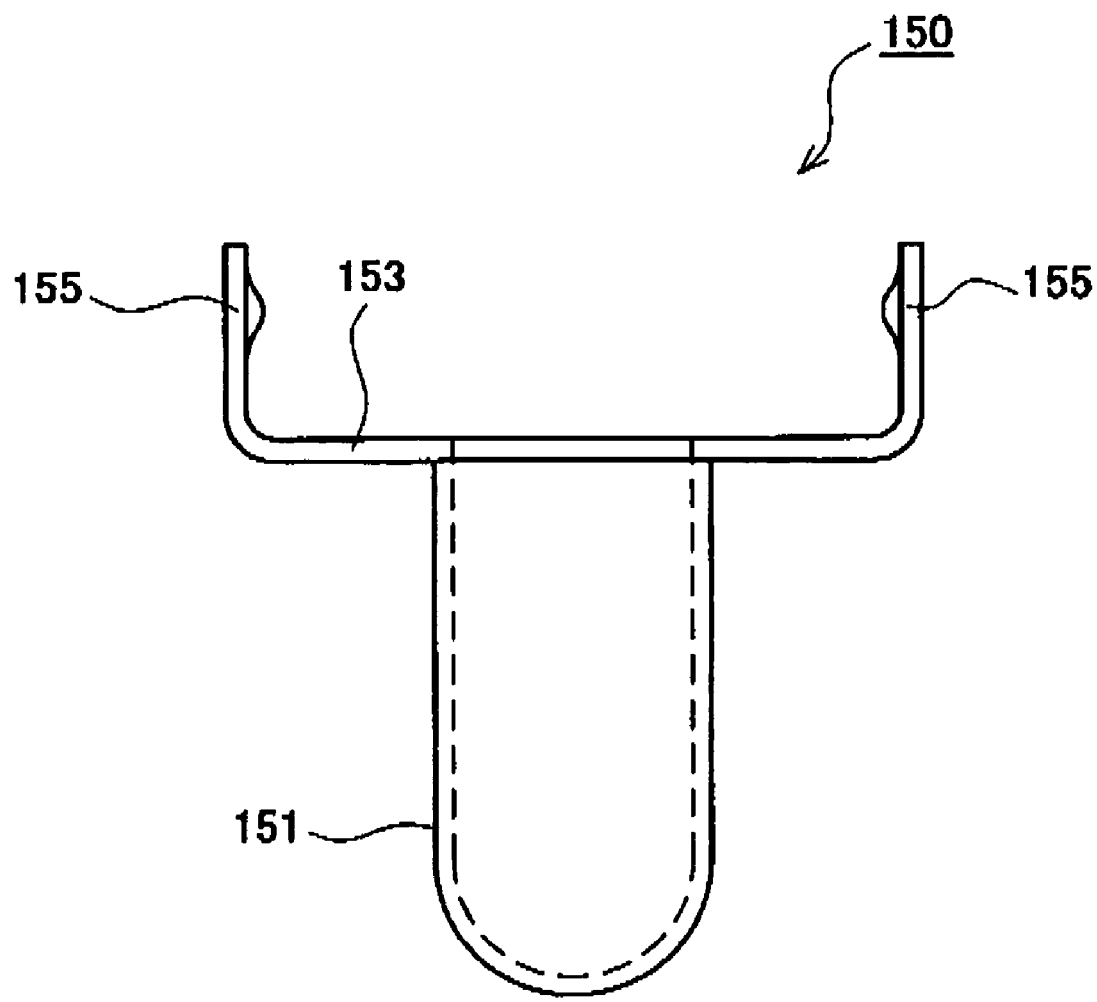
FIG. 9 is a plan view of the external positive terminal in the first embodiment.

Each of the external positive terminals 150 includes an electrode columnar portion 151 having a hollow cylindrical shape with a closed end (a right end in FIG. 3), a terminal flange portion 153 radially-outwardly extending from a base end (a left end in FIG. 3) of the electrode columnar portion 151, and four extended joint portions 155 extending from the terminal flange portion 153 in a direction perpendicular to the first wall 110a of the battery case 110. FIG. 7 shows one of the external positive terminals 150 singly, seen from base end side of the electrode columnar portion 151. FIGS. 8 and 9 show one of the external positive terminals 150 singly, seen from different sides.

Each of the extended joint portions 155 of the sealed battery (hereinafter, a "first sealed battery" for convenience in explaining) 100 is designed to overlap from outside with the external negative electrode portions (the first side wall 110c and the second side wall 110d) of another sealed battery (hereinafter, a "second sealed battery" for convenience in explaining) 100 when the first wall 110a of the first sealed battery 100 is placed to face the second wall 110b of the second sealed battery 100 and the external positive terminals 150 of the first sealed battery 100 are brought into contact with the second wall 110b of the second sealed battery 100, thereby connecting the first sealed battery 100 to the second sealed battery 100, as shown in FIG. 2.

To be more concrete, two of the four extended joint portions 155 of each external positive terminal 150 of the first sealed battery 100, the two being on the first side wall 110c side, overlap from outside with and are connectable to a portion of the first side wall 110c of the second sealed battery 100 contiguous to the second wall 110b. The other two extended joint portions 155 overlap from outside with and are connectable to a portion of the second side wall 110d of the second sealed battery 100 contiguous to the second wall 110b. In other words, the extended joint portions 155 of the first sealed battery 100 are disposed in overlapping relation with the two side walls (the first side wall 110c and the second side wall 110d) of the second sealed battery 100 from outside so that the batteries 100 are connectable to each other. The negative electrode of the power generation element 120 is connected to the inside of the second wall 110b of the battery case 110. Accordingly, the portions of the first and second side walls 110c and 110d contiguous to the second wall 110b correspond to the minimum conducting distance areas which have the electrically conducting path of a minimum distance to the negative electrode. Each of the extended joint portions 155 therefore overlaps from outside with and connected to the minimum conducting distance areas of the external negative electrode portions (the first side wall 110c and the second side wall 110d), so that the distance of the electrically conducting path between each extended joint portion 155 and the negative electrode is minimum.

Each external positive terminal 150 is fixedly attached to the battery case 110 through a seal member 160 having an electrically insulating property, as shown in FIG. 3. The seal member 160 includes a cylindrical portion 161 having one end (the right end in FIG. 3) positioned inside the battery and the other end (the left end in FIG. 3) positioned outside the battery, and a seal flange portion 163 extending radially-outwardly from the other end (the left end) of the cylindrical portion 161.

Each electrode columnar portion 151 of the external positive terminal 150 is mounted in a through hole of the battery case 110 with the one end (the right end) being positioned inside the battery and the other end (the left end) being exposed to the outside of the battery in a state where the cylindrical portion 161 of the seal member 160 is interposed between the electrode columnar portion 151 and the battery case 110. The one end side of the electrode columnar portion 151 is expanded radially-outwardly, forming a compressively deformed portion 151h which presses a part of the cylindrical portion 161 of the seal member 160 against the inside of the first wall 110a of the battery case 110. The terminal flange portion 153 presses the seal flange portion 163 of the seal member 160 against the outside of the first wall 110a of the battery case 110. With such configuration, the external positive terminal 150 and the battery case 110 (the first wall 110a) can be insulated reliably from each other and further airtightness of the battery case 110 can be ensured. The end (the compressively deformed portion 151h) of the electrode columnar portion 151 is fixed to the positive electrode collecting plate 130 by laser welding as mentioned above.

The sealed battery 100 structured as above is manufactured in the following manner. The power generation element 120 is first produced by a well known technique. The positive electrode lead portions 121r of the power generation element 120 are connected to a predetermined portion of the positive electrode collecting plate 130. The negative electrode lead portions 123r of the power generation element 120 are connected to a predetermined portion of a case member (hereinafter, a "first case member") constituting the battery case 110.

On the other hand, the external positive terminals 150 are fixed to the other case member (hereinafter, a "second case member") constituting the battery case 110. Specifically, the seal members 160 are first fitted in the through holes formed in the second case member and then the external positive terminals 150 are inserted respectively from the outside of the case. While fluid pressure is applied in the cylindrical portion of each electrode columnar portion 151, the electrode columnar portion 151 is axially compressed from the inside of the case. Thus, the one end (the right end in FIG. 3) side of the electrode columnar portion 151 is expanded radially-outwardly and compressively and axially deformed, so that the compressively deformed portion 151h is formed. In this state, the seal member 160 is tightly held between the terminal flange portion 153 and the compressively deformed portion 151h through the second case member to ensure airtightness and also the external positive terminal 150 is fixed to the second case member.

The first and second case members are then laser-welded to each other, thus sealing the battery case 110.

Successively, laser irradiation is applied from outside to a concave portion of the electrode columnar portion 151 of the external positive terminal 150 to connect the compressively deformed portion 151h to the positive electrode collecting plate 130.

The electrolytic solution is then poured into the battery case 110 through a through hole (an inlet) formed in the third side wall 110e. The safety valve 113 is attached to close the inlet. The sealed battery 100 is completed.

Next, the battery pack 500 in the first embodiment will be explained with reference to FIG. 2. This battery pack 500 comprises a plurality of battery modules 510 each including the plurality of sealed batteries 100 structured as above and electrically connected to each other in series. In each of the battery modules 510, the sealed batteries 100 are arranged in adjoining relation so that the first case surface 110a of the first sealed battery 100 faces the second wall 110b of the second sealed battery 100, and the external positive terminals 150 of the first sealed battery 100 are welded to the external negative electrode portions (the first side wall 110c and the second side wall 110d) of the second sealed battery 100, thereby connecting the adjoining batteries 100.

In the first embodiment, as explained above, each external positive terminal 150 has the extended joint portions 155 extending in the direction perpendicular to the first wall 110a. When the first sealed battery 100 is placed so that the first wall 110a thereof faces the second wall 110b of the second sealed battery 100 and the external positive terminals 150 come into contact with the second wall 110b of the second sealed battery 100, the extended joint portions 155 overlap from outside with the external negative electrode portions (the first side wall 110c and the second side wall 110d) of the second sealed battery 100, thereby connecting the first and second batteries 100 as shown in FIG. 2. Accordingly, the extended joint portions 155 can easily be welded to the external negative electrode portions (the first side wall 110c and the second side wall 110d) from the outside of the side walls 110c and 110d respectively. The sealed batteries 100 (the battery pack 500) connected to each other as above are impervious to breaking down at the connected area even when the batteries receive vibrations and bumps or when an expansive force arises from charge and discharge of the batteries. The sealed battery can enhance connection reliability.

In the first embodiment, moreover, the extended joint portions 155 of the external positive terminal 150 are laid to overlap from outside with the minimum conducting distance areas of the external negative electrode portions (the first side wall 110c and the second side wall 110d), providing the electrically conducting path of the minimum distance to the negative electrode of the power generation element 120. When the sealed batteries 100 are connected to each other as shown in FIG. 2, accordingly, the electrically conducting path from the negative electrode of the power generation element 120 to the extended joint portions 155 is the minimum. Therefore the electrical resistance between the negative electrode and the extended joint portions 155 can be minimized.

In the first embodiment, the battery case 100 is of a rectangular parallelepiped shape including the four side walls (the first through fourth side faces 110c, 110d, 110e, and 110f). Each of the external positive terminals 150 includes the four extended joint portions 155 which are laid to overlap from outside with two opposite side walls (the first and second side walls 110c and 110d) of the four side walls, Hence, in connecting the sealed batteries 100, the extended joint portions 155 of the first sealed battery 100 are connected to the second sealed battery 100 while holding the second sealed battery 100 from both side walls thereof. Consequently, the sealed batteries 100 can be connected to each other more reliably.

[SECOND EMBODIMENT]

A second embodiment will be described below, in which explanations of similar portions or structures to those in the first embodiment are omitted or simplified.

Figure 10:
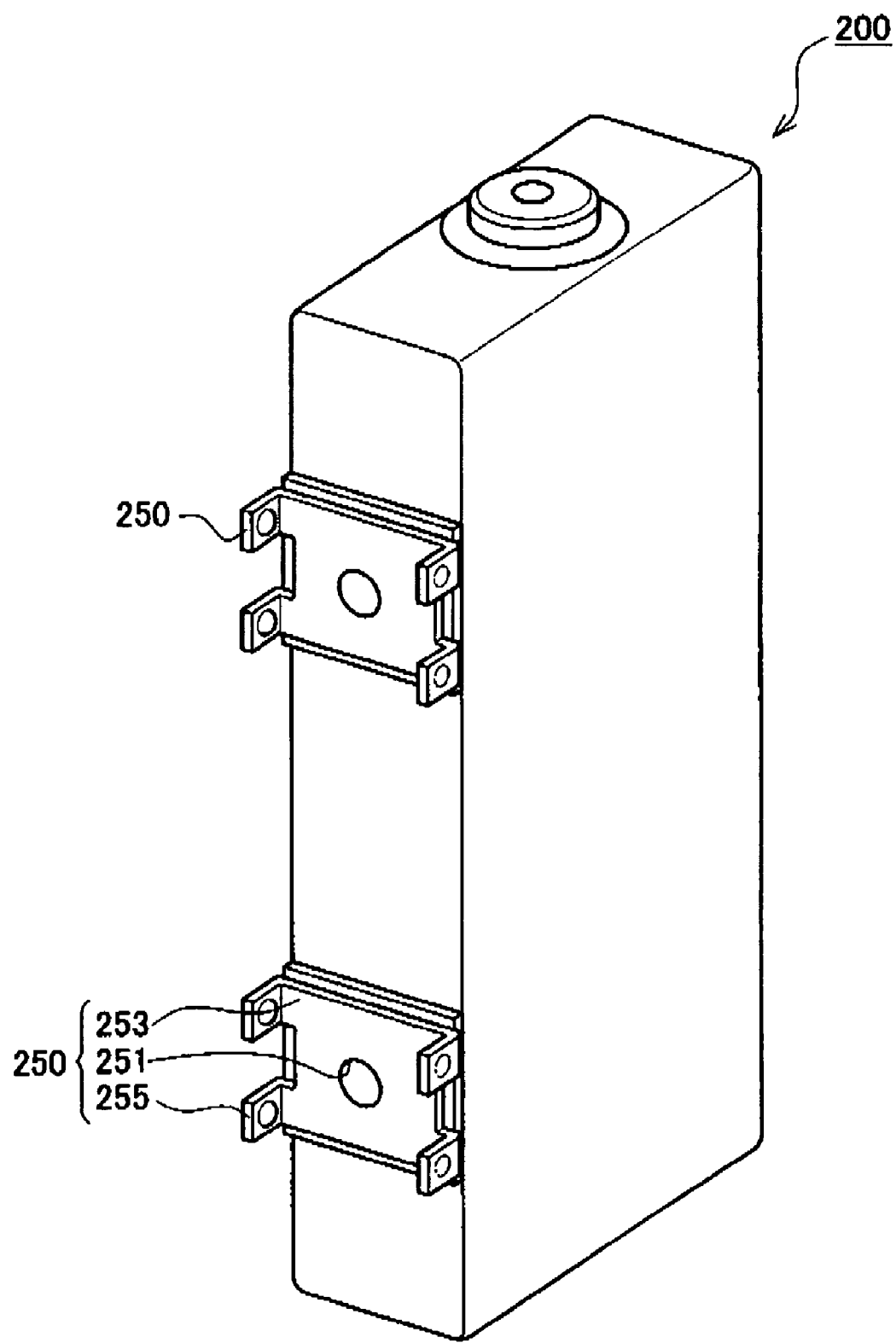
FIG. 10 is a perspective view of a sealed battery in a second embodiment.

FIG. 10 is a perspective view of a sealed battery 200 in the second embodiment. This battery 200 includes external positive terminals 250 which differ in shape from the external positive terminals 150 in the first embodiment. To be concrete, a terminal flange portion 253 is of a shape different from the terminal flange portion 153 in the first embodiment. Other portions and structures are the same as in the first embodiment. With such configuration, the same effects and operations as in the first embodiment can be produced.

[THIRD EMBODIMENT]

A third embodiment will be explained below, in which explanations of similar portions or structures to those in the first and second embodiments are omitted or simplified.

Figure 11:
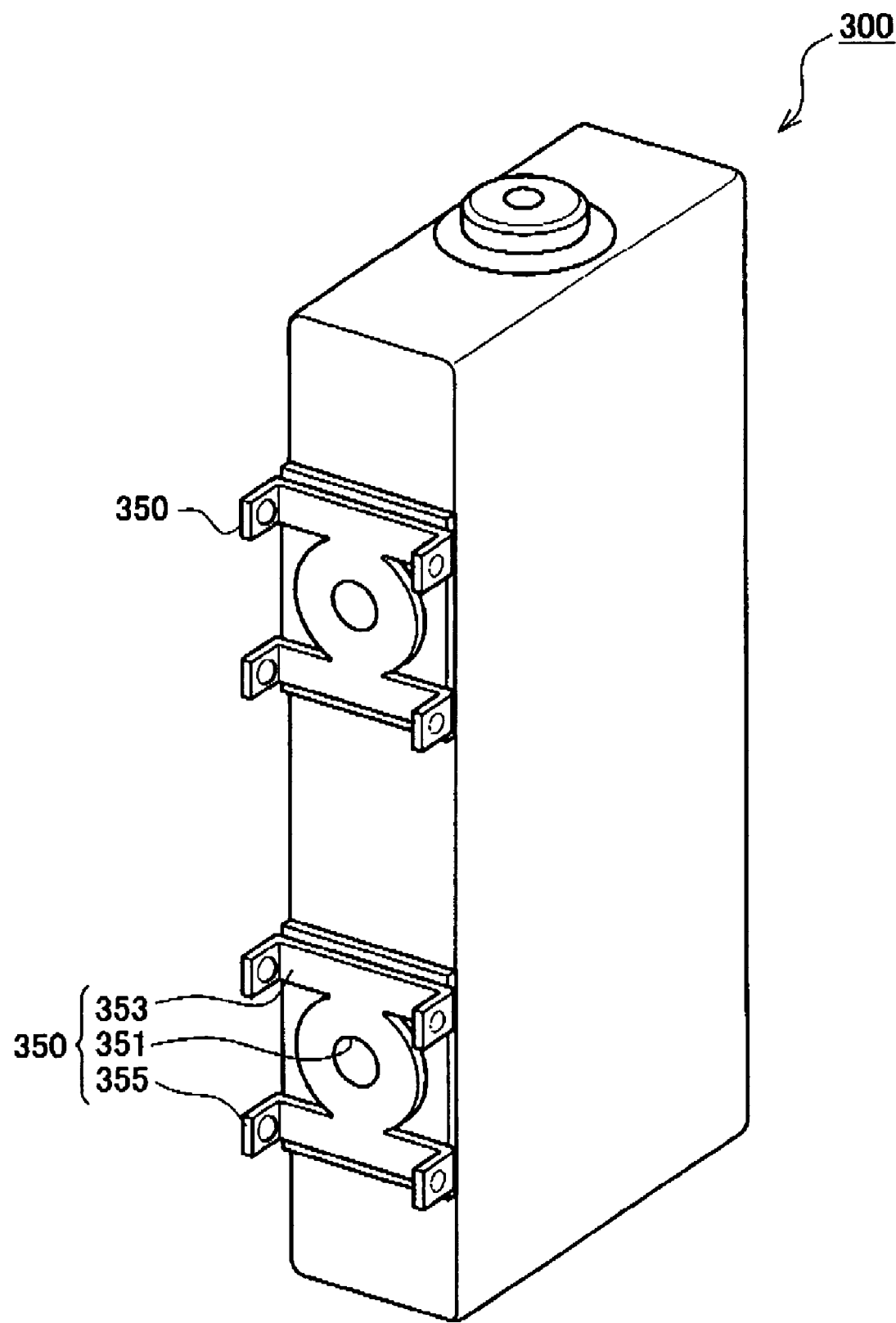
FIG. 11 is a perspective view of a sealed battery in a third embodiment.

FIG. 11 is a perspective view of a sealed battery 300 in the third embodiment. This battery 300 includes external positive terminals 350 which differ in shape from the external positive terminals 150 and 250 in the first and second embodiments. To be concrete, a terminal flange portion 353 is of a shape different from the external positive terminals 150 and 250 in the first and second embodiments. Other portions and structures are the same as in the first embodiment. With such configuration, the same effects and actions as in the first embodiment can be produced.

The present invention, which is explained as above in the preferred embodiments but not limited thereto, may be embodied in other specific forms without departing from the spirit or essential characteristics thereof.

What is claimed is:

1. A sealed battery comprising:
   a power generation element including a positive electrode and a negative electrode;
   a battery case which houses the power generation element and includes a first case wall, a second case wall formed in parallel with the first case wall, and a case side wall joining the first and second case walls, the case side wall including at least a part made of an electrically conductive material and serving as an external negative electrode portion electrically connected to the negative electrode; and
   an external positive terminal which is fixed to the first case wall and electrically connected to the positive electrode, and includes a part exposed to an outside of the case;
   wherein the external positive terminal includes an extended joint portion extending in a direction perpendicular to the first case wall and is structured to overlap from outside with an external negative electrode portion of a second sealed battery when the first case wall of the sealed battery faces a second case wall of the second sealed battery and the external positive terminal is brought into contact with the second case wall of the second sealed battery.

2. The sealed battery according to claim 1,
   wherein the external positive terminal is structured that the extended joint portion overlaps from outside with a minimum conducting distance area of the external negative electrode portion of the second sealed battery, having an electrically conducting path of a minimum distance to the negative electrode of the second sealed battery.

3. The sealed battery according to claim 1,
   wherein the battery case is of a rectangular parallelpiped shape having the four case side walls,
   the external positive terminal includes a plurality of the extended joint portions and is structured that the extended joint portions overlap from outside with the external negative electrode portions of two of the four case side walls of the second sealed battery.

4. A battery pack having at least one battery module which is including a plurality of the sealed batteries according to claim 1,
   wherein the battery module includes the sealed batteries arranged in series such that the first case wall of one of the sealed batteries faces the second case wall of a second sealed battery, and
   the extended joint portion of the sealed battery is connected to the external negative electrode portion of the second sealed battery so as to electrically connect the sealed batteries to each other in series.

* * * * *